United States Patent [19]

Pieper

[11] 4,125,408
[45] Nov. 14, 1978

[54] LOW THERMAL EXPANSION CERAMIC COMPOSITION

[76] Inventor: Paul S. Pieper, Box 1282, Wrangell, Ak. 99929

[21] Appl. No.: 736,561

[22] Filed: Oct. 28, 1976

[51] Int. Cl.$^2$ .............................................. C04B 35/04
[52] U.S. Cl. ....................................... 106/62; 106/63; 106/69; 106/73.4
[58] Field of Search ................... 106/46, 58, 62, 73.4; 423/328

[56] References Cited

U.S. PATENT DOCUMENTS

| | | | |
|---|---|---|---|
| 2,731,355 | 1/1956 | Skinner | 106/62 |
| 3,360,594 | 12/1967 | Criss | 106/64 |
| 3,427,174 | 2/1969 | Miller | 106/63 |
| 3,499,787 | 3/1970 | Inoue | 106/39.7 |
| 4,001,028 | 1/1977 | Frost et al. | 106/62 |
| 4,063,955 | 12/1977 | Fritsch et al. | 106/62 |

FOREIGN PATENT DOCUMENTS 2,324,477 12/1974 Fed. Rep. of Germany .......... 106/73.4
888,227 1/1962 United Kingdom .................... 106/73.4

OTHER PUBLICATIONS

Mason, B. - "Principles of Geochemistry" - 3rd. ed. (1966), John Wiley & Sons, N. Y., pp. 156-161, 252-253.
Searle, A. B. - "Refractory Materials" - 3rd ed. (1950), Chas. Griffin & Co., London, pp. 187-188.

*Primary Examiner*—Helen McCarthy
*Attorney, Agent, or Firm*—Sidney W. Millard

[57] ABSTRACT

A ceramic composition composed of a hydrothermal, high magnesium, plastic clay combined with suitable sources of MgO, SiO$_2$, and Al$_2$O$_3$ to result in a composition, the fired product of which results in a cordierite ceramic having low coefficient of thermal expansion characteristics that permit the use of said ceramic in flameware cooking utensils. For a similar cordierite like composition the mineral tremolite can be included in the composition to enhance moist workability and drying and firing dimension stability.

3 Claims, No Drawings

LOW THERMAL EXPANSION CERAMIC COMPOSITION

BACKGROUND OF THE INVENTION

Cordierite, ($2MgO \cdot 2Al_2O_3 \cdot 5SiO_2$) and cordierite-like ceramic materials have been known and used for many years in the fabrication of thermal shock resistant cooking utensils. Generally, the prior art has made use of commercial clays of more or less plasticity combined with less plastic materials to provide the required constituents to develop a body near the stoichiometric equivalent of cordierite.

Most of the compositions in the prior art result in a body having high firing temperatures (1300° C. to 1410° C.), short firing range and poor wet working characteristics.

It is therefore the purpose of the present invention to diminish these problems by substituting common and uncommon mineral materials. In addition to the usual commercial, more or less plastic clay of reasonable purity, alumina or other source of $Al_2O_3$, use is made of the slightly plastic, clay like, mineral of low tenacity, saponite ($9MgO \cdot Al_2O_3 \cdot 10SiO_2 \cdot 15$–$16\ H_2O$, Dana's Textbook of Mineralogy, 7th ed.) or an unusual, hydrothermal, high magnesium, plastic clay of good tenacity known to occur in veins associated with said saponite. In addition to these, use is also made of the crystalline mineral tremolite in certain variations of the present composition.

The hydrothermal, high magnesium, plastic clay presents a problem of definition. Being of hydrothermal occurrence it is distinct in origin from the usual montmorillonite which is said to be the product of autogenous alteration or of weathering of clastic materials of volcanic origin or other clastic materials. It also differs from the usual montmorillonite in being higher in magnesium content (9 to 20% MgO as against 0 to 8.8% MgO for montmorillonite). Dry montmorillonite swells substantially with addition of water whereas the present high Mg. clay is similar to the usual ball clay in this respect.

The use of the term "cordierite like ceramic" as distinct from "cordierite ceramic" seems most suitable because the use of tremolite adds calcium which is not a constituent of the idealized cordierite crystal structure.

In spite of the CaO content, the use of tremolite is advantageous because the lath like form of the ground tremolite particles contributes to wet workability and possibly to firing stability.

At this writing it isn't known by the applicant how much of the CaO is in the form of inter-crystalline glass, mixed crystal, or substitutional in the cordierite lattice. But the thermal expansion characteristics remain suitable for thermal shock resistant cookware.

It is therefore the purpose of this invention to compound a ceramic body composition of such low thermal expansion characteristics that it is suitable for use in thermal shock resistant cookware.

It is another object of this invention to provide an unfired composition that has enhanced characteristics of tenacity and plasticity so as to facilitate fabrication in the moist state.

It is another object of this invention to provide a composition that has good dimension stability under drying and firing conditions.

It is another object of this invention to provide a composition that has a low firing temperature.

It is another object of this invention to provide a composition that has a firing range of sufficient scope that delicate temperature controls are not essential.

It is another object of this invention to provide a composition that has rapid drying characteristics.

These and other objects of this invention will be apparent to one skilled in the art from a total consideration of the disclosure.

BRIEF SUMMARY OF THE INVENTION

The above objectives are accomplished in accordance with this invention by the intimate mixing, with sufficient water to facilitate fabrication, of the constituent materials in near stoichiometric proportions and diadochic equivalents, as in the case of CaO, to result in a cordierite-like fired product, said constituent materials being: a high magnesium clay or saponite, alumina or alumina hydrate, a kaolin type clay (as kaolin, fire clay and ball clay), and tremolite.

The preceeding brief summary is now illustrated in greater detail by means of specific examples showing modes of practicing the invention.

EXAMPLE I

Using a saponite having approximately 14% MgO, 9% $Al_2O_3$, 55% $SiO_2$, 20% volatile (primarily $H_2O$), and 2% minor impurity oxides as CaO and $Fe_2O_3$ (which are not computed in the table) as an example, one of a plurality of possible mixtures, to achieve a composition that will fire to a cordierite-like ceramic below 1300° C., is shown.

All measurements are by weight in the following table.

TABLE I

|  | CaO | MgO | $Al_2O_3$ | $SiO_2$ |
|---|---|---|---|---|
| 100 parts saponite |  | 14 | 9 | 55 |
| 100 parts plastic fire clay |  |  | 38 | 46 |
| 49 parts alumina |  |  | 50 |  |
| 56 parts tremolite | 7.8 | 14 |  | 33 |
| 10 parts silica |  |  |  | 10 |
|  | 7.8 | 28 | 97 | 144 = 276.8 |
|  | 2.8% | 10.1% | 35% | 52% |

EXAMPLE II

Using, with sufficient water to render workable, a high magnesium plastic clay of good tenacity having approximately 10.9% MgO, 16.5% $Al_2O_3$, 56% $SiO_2$, 14.6% volatile (primarily $H_2O$) and less than 2% other oxides with a suitable commercial clay of acceptable purity, alumina, and tremolite in the proportions as shown in the following table, one of a plurality of possible mixtures to achieve a composition that will fire to a cordierite-like ceramic below 1300° C. is obtained.

TABLE II

|  | CaO | MgO | $Al_2O_3$ | $SiO_2$ |
|---|---|---|---|---|
| 200 parts high Mg. plastic clay |  | 21.8 | 33 | 112 |
| 100 parts kaolin (E.P.K.) |  |  | 38 | 46 |
| 60 parts alumina |  |  | 60.2 |  |
| 72 parts tremolite | 10 | 18 |  | 42 |
|  | 10 | 39.8 | 131.2 | 200 = 381 |

TABLE II-continued

| CaO | MgO | Al$_2$O$_3$ | SiO$_2$ |
|---|---|---|---|
| 2.6% | 10.4% | 34.4% | 52.5% |

It will be seen that the percentages of the constituent oxides in the preceeding tables approximates the stoichiometric proportions of corderite (13.7 MgO, 34.9% Al$_2$O$_3$, and 51.4% SiO$_2$) but allowing for the diadochic inclusion of CaO for part of the MgO.

It will also be noted that there are minor amounts of oxides other than MgO, Al$_2$O$_3$, and SiO$_2$ in the saponite and high magnesium plastic clay. It is also assumed that minor impurities also occur in the other materials used in the described variations of the present process. It will be recognized by those skilled in the art that adjustment in the formulation can be used to overcome certain deleterious effects of such impurities.

While said impurities might contribute to the lower, broader firing range, both iron and calcium are said to occur in the natural mineral cordierite and the presence of such elements is not intended to alter the spirit of the invention in other characteristics.

It will also be recognized by those skilled in the art that in those instances in which Al$_2$O$_3$ and SiO$_2$ are required to adjust the magnesium clays for a cordierite or cordierite-like product, clay of the kaolin type, kyanite, or similar compounds can be utilized; where Al$_2$O$_3$ is indicated alumina or the common alumina hydrates can be utilized; where MgO is required, that oxide, the precipitated carbonate, or magnesite can be utilized; when MgO and SiO$_2$ are required, talc or forsterite can be utilized; in situations wherein a dense grog is preferred various combinations of the preceding materials can be prefired in the desired proportions and ground to a mesh that will optimize intimate mixing with the magnesium clays to adjust those clays to a composition that will fire to the cordierite or cordierite-like composition.

While the invention has been described herein with references to certain preferred embodiments, it is to be understood that various changes and modifications may be made by those skilled in the art without departing from the concept of the invention, the scope of which is to be determined by reference to the following claims.

What I claim is:

1. A composition of matter consisting essentially of from 20% to 75% by weight of a hydrothermal high magnesium plastic clay containing about 9-20% MgO intimately mixed with a conventional source of Al$_2$O$_3$ and SiO$_2$ and 5% to 20% of crystalline tremolite, at least some being in a ground lath-like form, said constituents supplied in amounts to approximate the stoichiometric proportions of a cordierite-like ceramic, the CaO content of said tremolite contributing diadochically for part of the MgO in said ceramic, said composition having the capability of being fired at below 1300° C. to produce said cordierite-like ceramic of low thermal expansion characteristics.

2. A composition of matter consisting essentially of from 25% to 60% by weight of saponite, said saponite being intimately mixed with at least one conventional source of Al$_2$O$_3$ and SiO$_2$ and 5% to 20% of crystalline tremolite, at least some being in a ground lath-like form, said constituents being supplied in amounts to approximate the stoichiometric proportions of a cordierite-like ceramic, the CaO content of said tremolite contributing diadochically for part of the MgO in said ceramic, said composition having the capability of being fired at below 1300° C. to produce said cordierite-like ceramic of low thermal expansion characteristics.

3. A composition of matter according to claim 2, wherein said constituents are intimately mixed in suitable proportions, said mixture being pre-fired and ground to suitable mesh to optimize intimate mixing in said stoichiometric proportions.

* * * * *